United States Patent
Wu et al.

(10) Patent No.: US 10,869,237 B2
(45) Date of Patent: *Dec. 15, 2020

(54) RESOURCE SELECTION APPARATUS AND COMMUNICATION SYSTEM

(71) Applicant: FUJITSU LIMITED, Kawasaki (JP)

(72) Inventors: Lianhai Wu, Beijing (CN); Haibo Xu, Beijing (CN); Ningjuan Chang, Beijing (CN); Yanling Lu, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 24 days.

This patent is subject to a terminal disclaimer.

(21) Appl. No.: 15/345,438

(22) Filed: Nov. 7, 2016

(65) Prior Publication Data

US 2017/0070924 A1 Mar. 9, 2017

Related U.S. Application Data

(63) Continuation of application No. PCT/CN2014/077148, filed on May 9, 2014.

(51) Int. Cl.
| | | |
|---|---|---|
| *H04W 36/00* | (2009.01) | |
| *H04W 72/04* | (2009.01) | |
| *H04W 76/14* | (2018.01) | |
| *H04W 36/08* | (2009.01) | |
| *H04W 76/23* | (2018.01) | |
| *H04W 76/19* | (2018.01) | |

(52) U.S. Cl.
CPC ....... *H04W 36/0072* (2013.01); *H04W 36/08* (2013.01); *H04W 72/048* (2013.01); *H04W 72/0446* (2013.01); *H04W 76/14* (2018.02); *H04W 76/23* (2018.02); *H04W 76/19* (2018.02)

(58) Field of Classification Search
None
See application file for complete search history.

(56) References Cited

U.S. PATENT DOCUMENTS

| | | | |
|---|---|---|---|
| 9,668,278 B2* | 5/2017 | Lee | H04W 76/14 |
| 2013/0102314 A1 | 4/2013 | Koskela et al. | |
| 2013/0308551 A1 | 11/2013 | Madan et al. | |
| 2014/0106757 A1 | 4/2014 | Hakola et al. | |
| 2016/0277922 A1* | 9/2016 | Gunnarsson | H04W 8/26 |
| 2016/0338124 A1* | 11/2016 | Byun | H04W 76/00 |

FOREIGN PATENT DOCUMENTS

| | | |
|---|---|---|
| CN | 102783211 A | 11/2012 |
| CN | 103200634 A | 7/2013 |
| CN | 103582127 A | 2/2014 |
| EP | 2 543 212 A1 | 9/2011 |

(Continued)

OTHER PUBLICATIONS

Notice of Preliminary Rejection issued by the Korean Intellectual Property Office for corresponding Korean Patent Application No. 10-2016-7032277, dated Oct. 25, 2017, with English translation.

(Continued)

*Primary Examiner* — Saba Tsegaye
(74) *Attorney, Agent, or Firm* — Myers Wolin, LLC

(57) ABSTRACT

An apparatus and method to select a resource for performing device to device (D2D) communication from a resource pool configured in a second mode by a first eNB.

6 Claims, 9 Drawing Sheets

(56) References Cited

FOREIGN PATENT DOCUMENTS

| JP | 2017-509261 A | 3/2017 |
|---|---|---|
| WO | 2011/109027 A1 | 9/2011 |
| WO | 2013/097144 A1 | 7/2013 |
| WO | 2014/014323 A1 | 1/2014 |
| WO | 2015/142113 A1 | 9/2015 |

OTHER PUBLICATIONS

CATT, "LTE network manage and continuously control for D2D", Agenda Item: 7.4.4, 3GPP TSG-RAN WG2 Meeting #85bis, R2-141198, Valencia, Spain, Mar. 31-Apr. 4, 2014.

Extended European search report with supplementary European search report and the European search opinion issued by the European Patent Office for corresponding European Patent Application No. 14891382.5, dated Dec. 15, 2017.

Ericsson, "Mobility for D2D UEs", Agenda Item: 18.3, 3GPP TSG-RAN WG3 Meeting #82, R3-132277, San Francisco, USA, Nov. 11-15, 2013.

Samsung, "Mobility scenario analysis for D2D", Agenda Item: 21, 3GPP TSG-RAN WG3 Meeting #83, R3-140150, Prague, Czech Republic, Feb. 10-14, 2014.

Fujitsu, "Remaining issues on resource allocation and mobility related issues for D2D communication", Agenda Item: 7.3.2.1.3, 3GPP TSG-RAN WG2 Meeting #87bis, R2-144288, ShangHai, China, Oct. 6-10, 2014.

Partial supplementary European search report issued by the European Patent Office for corresponding European Patent Application No. 14891382.5, dated Aug. 22, 2017.

Interdigital: "Determination of in-coverage, out-of-coverage, edge of coverage for D2D UEs", Agenda Item: 7.2.7.2.3, 3GPP TSG-RAN WG1 Meeting #76bis, R1-141559, Shenzhen, China, Mar. 31-Apr. 4, 2014.

Sony: "D2D Resource Allocation Mode Selection", Agenda Item: 7.4.2, 3GPP TSG-RAN WG2 Meeting #85bis, R2-141300, Valencia, Spain, Mar. 31-Apr. 4, 2014.

Ericsson: "Seamless switching of D2D transmission modes", Agenda Item: 7.4.2, 3GPP TSG-RAN WG2 Meeting #85bis, R2-141261, Valencia, Spain, Mar. 31-Apr. 4, 2014.

Fujitsu: "Further considerations on the mode configuration and exceptional cases", Agenda Item: 7.4.2.1, 3GPP TSG-RAN WG2 Meeting #87, R2-143145, Dresden, Germany, Aug. 18-22, 2014.

Institute for Information Industry (III); "Mode switching and exceptional cases for D2D Communication", Agenda Item: 7.4.2.1, 3GPP TSG-RAN WG2 Meeting #87, R2-143366, Dresden, Germany, Aug. 18-22, 2014.

Notification of Reasons for Refusal issued for corresponding Japanese Patent Application No. 2016-566900, dated Sep. 19, 2017, with an English translation.

Samsung, "Definitions of in-coverage, out-of-coverage, edge-of-cell coverage", Agenda Item: 7.2.7.2.3, 3GPP TSG-RAN WG1 Meeting #76bis, R1-141309, Shenzhen, China, Mar. 31-Apr. 4, 2014.

Interdigital Communications, "Mode Selection and Resource Pool Selection for D2D UEs", Agenda Item: 7.4.2, 3GPP TSG-RAN WG2 Meeting #85bis, R2-141695, Valcenia, Spain, Mar. 31-Apr. 4, 2014.

Qualcomm Incorporated, "Definitions of coverage states and mode switching for D2D", Agenda Item: 7.2.7.2.3, 3GPP TSG-RAN WG1 Meeting #76bis, R1-141452, Shenzhen, China, Mar. 31-Apr. 4, 2014.

First Notification of Office Action issued by the China National Intellectual Property Administration for corresponding Chinese Patent Application No. 201480077231.0, dated Mar. 29, 2019, with an English translation.

Search Report issued by the China National Intellectual Property Administration for corresponding Chinese Patent Application No. 201480077231.0, dated Mar. 29, 2019, with an English translation.

International Search Report issued for corresponding International Patent Application No. PCT/CN/2014/077148, dated Feb. 26, 2015, with an English translation.

Written Opinion of the International Searching Authority issued for corresponding International Patent Application No. PCT/CN2014/077148, dated Feb. 26, 2015, with an English translation.

Communication pursuant to Article 94(3) EPC issued by the European Patent Office for corresponding European Patent Application No. 14 891 382.5-1214, dated Jan. 22, 2019.

Samsung, "Signaling flows for Type 2B Resource Allocation", 3GPP TSG RAN WG2 meeting #85bis, R2-141388, Agenda Item: 7.4.3, Mar. 31-Apr. 4, 2014, Valencia, Spain.

ITRI, "Discussion on Inter-Cell D2D Discovery", 3GPP TSG RAN WG2#85bis, R2-141349, Agenda Item: 7.4.3, Mar. 31-Apr. 4, 2014, Valencia, Spain.

Japanese Office Action issued for corresponding Japanese Patent Application No. 2018-148521, dated Jul. 19, 2019, with English translation.

Final Notification of Reasons for Refusal issued by the Japan Patent Office for corresponding Japanese Patent Application No. 2018-148521, dated Oct. 23, 2019, with an English translation.

Panasonic, "UE states and Resource allocation for D2D Communication", Agenda Item: 7.2.2.3, 3GPP TSG-RAN WG1, Meeting #76bis, R1-141222, Shenzhen, China, Mar. 31-Apr. 4, 2014.

Alcatel-Lucent et al., "Resource pool configuration for Mode 2 UE", Agenda Item: 7.4.2, 3GPP TSG-RAN WG2, Meeting #85bis, R2-141658, Valencia, Spain, Mar. 31-Apr. 4, 2014.

3GPP, "D2D communication configuration and signaling (control part)", Agenda Item: 7.4.2, 3GPP TSG-RAN WG2, Meeting #85bis, R2-141715, Valencia, Spain, Mar. 31-Apr. 4, 2014.

Panasonic, "UE states and Resource allocation for D2D Communication", Agenda Item: 7.4.2, 3GPP TSG-RAN WG2, Meeting #85bis, R2-141751, Valencia, Spain, Mar. 31-Apr. 4, 2014.

Non-Final Office Action issued by the United States Patent and Trademark Office for corresponding U.S. Appl. No. 16/596,375, electronically dated Nov. 13, 2019.

Second Notification of Office Action issued by the China National Intellectual Property Administration for corresponding Chinese Patent Application No. 201480077231.0, dated Feb. 25, 2020, with an English translation.

* cited by examiner

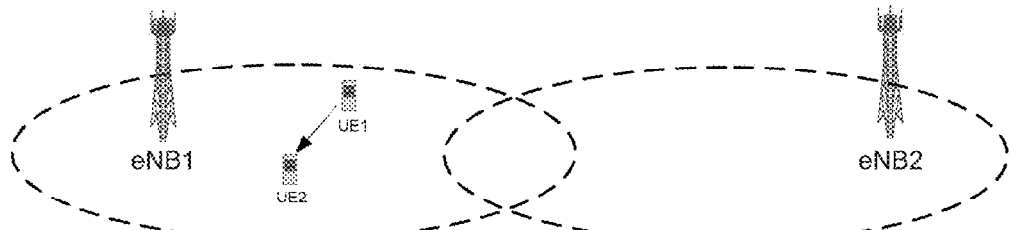

FIG. 1

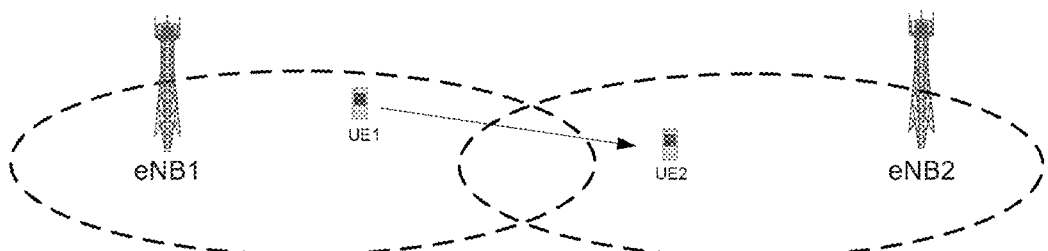

FIG. 2

301 selecting, by UE, a resource for performing D2D communication from a resource pool configured in a second mode by a first eNB or a second eNB after the UE is disconnected from the first eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE

302 releasing the resource pool after the UE receives the first resource allocated in the first mode by the second eNB, or when the UE receives from the second eNB indication information indicating the UE to use the first resource

FIG. 3

RESOURCE SELECTION APPARATUS AND COMMUNICATION SYSTEM

CROSS REFERENCE TO RELATED APPLICATIONS

This application is a continuation application of International Application PCT/CN2014/077148 filed on May 9, 2014, the entire contents of which are incorporated herein by reference.

TECHNICAL FIELD

The present disclosure relates to the field of communications, and in particular to a resource selection apparatus and communication system.

BACKGROUND ART

Device to device (D2D) communication refers to that data packets need not to pass through a core network, even need not to pass through an eNB, and a communication link is established directly between two pieces of UE (UE1 and UE2) for performing communication. FIG. 1 is a schematic diagram of establishing D2D communication between two pieces of UE belonging to the same eNB, and FIG. 2 is a schematic diagram of establishing D2D communication between two pieces of UE belonging to different eNBs.

Before UE performs D2D direct communication, an eNB need to allocate a communication resource for the UE. And a mode for allocating a D2D communication resource by the eNB includes a mode 1 and a mode 2.

A resource allocation scheme of mode 1: which is an allocation scheme scheduled by the eNB; before the eNB schedules the resource of mode 1, the UE needs to enter into a radio resource control (RRC) connected state (RRC_Connected state), and transmits a resource request to the eNB by means of a buffer state report (BSR), etc. After receiving the request, the eNB allocates a resource for the UE.

A resource allocation scheme of mode 2: the eNB notifies the UE of a time-frequency location of the resource pool via broadcast or specific signaling. When the UE is not covered by the eNB, the resource pool of mode 2 is preconfigured in the UE. After obtaining the resource pool, the UE may select a resource for D2D communication from the resource pool on its own.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

For UE not covered by an eNB, the resource of mode 2 may only be used. However, for UE that can use both the resource allocation modes, there exists no method for solving a problem that a resource of which mode is selected.

In order to solve the above problem, embodiments of the present invention provide a resource selection apparatus and communication system. With the apparatus, the UE is facilitated to select a corresponding resource for communication, so as to ensure continuity of the D2D communication, and avoid disconnection.

According to a first aspect of the embodiments of the present invention, there is provided a resource selection apparatus, including:

a first selection unit configured to select a resource for performing device to device (D2D) communication from a resource pool configured in a second mode by a first eNB or a second eNB after user equipment (UE) is disconnected from the first eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE.

According to a second aspect of the embodiments of the present invention, there is provided a resource selection apparatus, including:

a first transmitting unit configured to transmit a handover request to a second eNB according to a measurement result transmitted by UE, the handover request comprising information on that the UE is performing D2D communication, and/or an allocation mode and a resource location of a D2D communication resource used by the UE;

a first receiving unit configured to receive configuration information fed back by the second eNB according to the handover request, the configuration information comprising a time-frequency location of a resource pool configured in a second mode by the second eNB, and/or information indicating whether the second eNB supports a resource allocation scheme in a first mode, and/or a resource location of a resource allocated in the first mode by the second eNB; and a first configuring unit configured to configure the configuration information for the UE.

According to a third aspect of the embodiments of the present invention, there is provided a communication system, including a first eNB, a second eNB and UE, wherein, after the UE is disconnected from the first eNB, the UE selects a resource for performing device to device (D2D) communication from a resource pool configured in a second mode by a first eNB or a second eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE.

An advantage of the embodiments of the present invention exists in that the UE may use the resource selected from the resource pool configured by the first eNB or the second eNB in the second mode for communication in a prescribed period, so that the UE is facilitated to select a corresponding resource for the D2D communication when the UE is in a scenario of handover or failure reestablishment, etc, so as to ensure continuity of the D2D communication, and avoid disconnection.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings:

FIG. 1 is a schematic diagram of establishing D2D communication between two pieces of UE belonging to the same eNB;

FIG. 2 is a schematic diagram of establishing D2D communication between two pieces of UE belonging to different eNBs;

FIG. 3 is a flowchart of the resource selection method of Embodiment 1 of the present invention;

DETAILED DESCRIPTION OF THE INVENTION

Figure 4A:
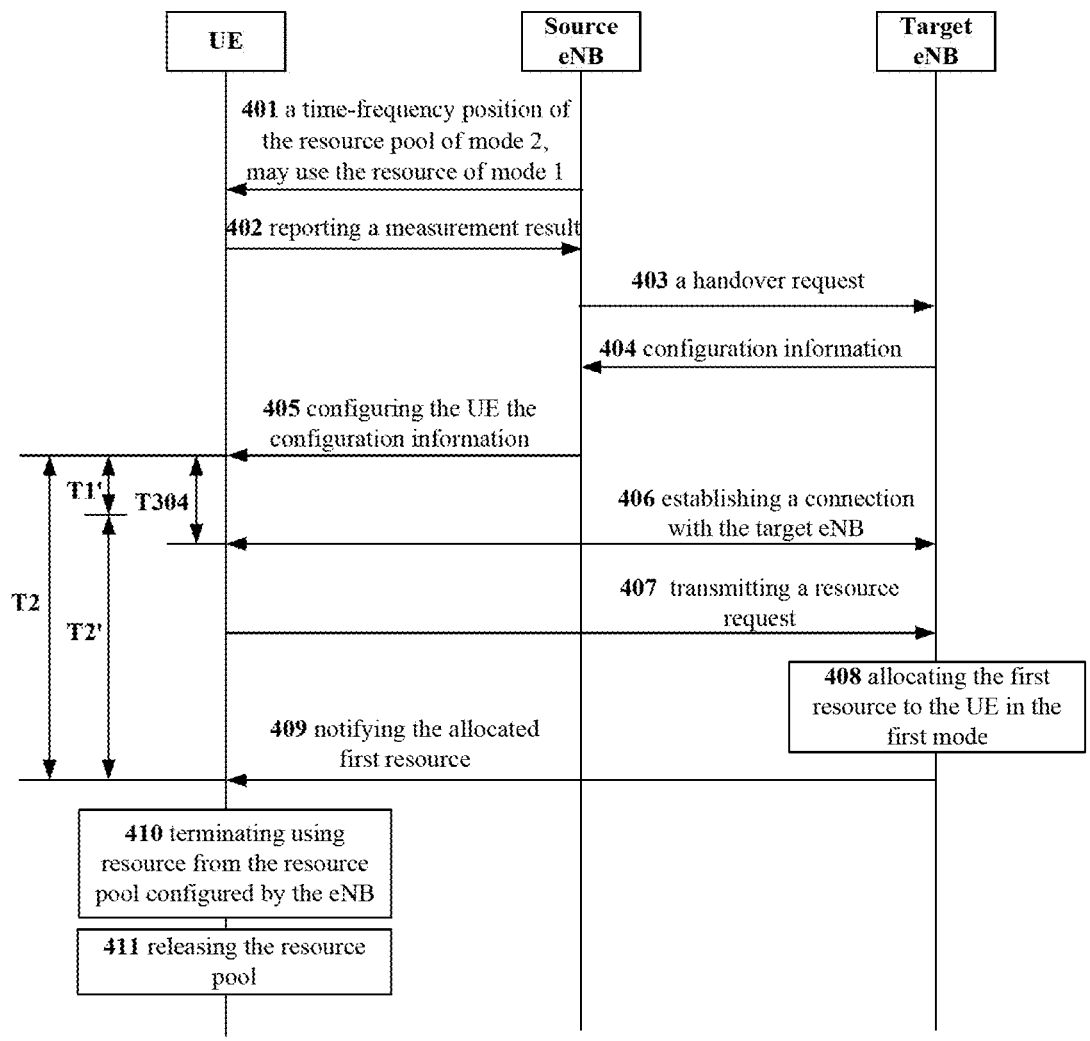
FIGS. 4A and 4B are flowcharts of the resource selection method of Embodiment 2 of the present invention.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims. Various embodiments of the present invention shall be described below with reference to the accompanying drawings.

Embodiment 1

Embodiment 1 of the present invention provides a resource selection method. FIG. 3 is a flowchart of the method. Referring to FIG. 3, the method includes:

Step 301: selecting, by UE, a resource for performing device to device (D2D) communication from a resource pool configured in a second mode by a first eNB or a second eNB after the UE is disconnected from the first eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE.

In this embodiment, the first resource allocated in the first mode by the eNB may be a resource allocated in an allocation scheme scheduled by the eNB, which may be referred to as a resource of mode 1; the resource pool configured by the eNB in the second mode may be referred to as a resource pool of mode 2; and the UE selects the resource for D2D communication from the resource pool, the first mode and the second mode corresponding to mode 1 and mode 2 described in the Background Art.

It can be seen from the above embodiment that when the UE is disconnected from one eNB and is connected to another eNB, before receiving the first resource allocated by the other eNB in the first mode, the UE selects the resource for performing D2 communication from the resource pool configured by the above eNB in the second mode, so as to ensure continuity of the D2D communication, and avoid disconnection.

In this embodiment, in a scenario of handover, the first eNB may be a source eNB, and the second eNB may be a target eNB; or in a scenario of failure reestablishment, the first eNB is an eNB where is UE is present when failure occurs in the UE, and the second eNB is an eNB reestablishing a connection with the UE, which may be the first eNB, and may also be another eNB.

For example, for the failure reestablishment scenario, a failure occurs in the UE, and the UE is disconnected from the first eNB, triggers an initialization reestablishment process, selects an appropriate cell and reestablishesa connection to an eNB of the cell, such as the second eNB. Wherein, the initialization reestablishment process may be triggered when a radio link failure (RLF), a handover failure, an eNB reconfiguration failure, or an underlying integrity check failure occurs.

In this embodiment, when the failure of triggering the initialization reestablishment process is a radio link failure (RLF), the UE selects the resource for D2D communication from the resource pool configured by the first eNB or the second eNB in the second mode in the first period (T1) from the UE receives the physical layer out-of-synchronization indication information to the UE receives the first resource allocated in the first mode by the second eNB reestablishing a connection with the UE, but does not use the first resource configured by the eNB in the first mode.

In this embodiment, when the failure of triggering the initialization reestablishment process is a handover failure, the UE selects the resource for D2D communication from the resource pool configured by the first eNB or the second eNB in the second mode in the second period (T2) from the UE receives the configuration information triggering the UE to be handed over to the second eNB to the UE receives the first resource allocated in the first mode by the second eNB, but does not use the first resource configured by the eNB in the first mode.

In this embodiment, when the failure of triggering the initialization reestablishment process is an eNB reconfiguration failure, an underlying integrity check failure, or a handover failure, the UE selects the resource for D2D communication from the resource pool configured by the first eNB or the second eNB in the second mode in the third period (T3) from the UE initializes the reestablishment to the UE receives the first resource allocated in the first mode by the second eNB reestablishing a connection with the UE, but does not use the first resource configured by the eNB in the first mode.

In this embodiment, when the failure of triggering the initialization reestablishment process is a handover failure, the UE selects the resource for D2D communication from the resource pool configured by the first eNB or the second eNB in the second mode in the fourth period (T4) from the UE transmits the reestablishment request to the UE receives the first resource allocated in the first mode by the second eNB reestablishing a connection with the UE, but does not use the first resource configured by the eNB in the first mode.

For example, for the handover scenario, after the UE receives the configuration information triggering the UE to be handed over to the second eNB, the UE is disconnected from the first eNB, and establishes a connection with the second eNB via a random access process.

The UE selects the resource for D2D communication from the resource pool configured by the first eNB or the second eNB in the second mode in the second period (T2) from the UE receives the configuration information triggering the UE to be handed over to the second eNB to the UE receives the first resource allocated in the first mode by the second eNB, but does not use the first resource configured by the eNB in the first mode.

It can be seen from the resource selection method of this embodiment that the UE may use the resource selected from the resource pool configured by the first eNB or the second eNB in the second mode for communication in the first period, the second period, the third period or the fourth period, which facilitates the UE to select a corresponding resource for the D2D communication in a handover or a failure reestablishment scenario, so as to ensure continuity of the D2D communication.

In this embodiment, in the first period, the second period, the third period or the fourth period, the UE may either select a resource in the resource pool configured by the first eNB, or select a resource in the resource pool configured by the second eNB; and furthermore, it may select a resource in a manner as follows:

after receiving the resource pool configured by the second eNB in the second mode, the UE selects the resource for D2D communication from the resource pool configured by the second eNB; and before receiving the resource pool configured by the second eNB in the second mode, the UE selects the resource for D2D communication from the resource pool configured by the first eNB in the second mode.

For example, when the UE performs inter-cell handover, it may use the resource pool of mode 2 configured by the source eNB or the target eNB; or after receiving the resource pool configured by the target eNB, the UE selects the resource for D2D communication from the resource pool configured by the target eNB; and before receiving the resource pool configured by the target eNB, the UE selects the resource for D2D communication from the resource pool configured by the source eNB.

For example, when the UE performs failure reestablishment, it may use the resource pool of mode 2 configured by the eNB where the UE is present when the failure occurs or the eNB to which a connection is reestablished by the UE; or after receiving the resource pool of mode 2 configured by the eNB to which a connection is reestablished by the UE, the UE selects the resource for communication from the resource pool configured by the eNB to which a connection is reestablished by the UE; and before receiving the resource pool of mode 2 configured by the eNB to which a connection is reestablished by the UE, the UE selects the resource for D2D communication from the resource pool configured by the eNB where the UE is present when the failure occurs.

In this embodiment, as shown in FIG. 3, the method further includes:

Step 302: releasing the resource pool after the UE receives the first resource allocated in the first mode by the second eNB, or when the UE receives from the second eNB indication information indicating the UE to use the first resource.

Wherein, after the UE is connected to the second eNB and receives the indication information, the UE terminates use of the resource of mode 2, releases the resource pool of mode 2, request the second eNB for the first resource, and uses the first resource after obtaining the first resource allocated by the eNB.

The above resource pool may include the resource pool configured by the first eNB and/or the second eNB in the second mode.

For example, when the UE performs inter-cell handover, after the UE receives the resource of mode 1 allocated by the target eNB, the MAC layer will be configured with the resource of mode 1, and at the same time, the resource of mode 2 will be released; or, when the UE receives the indication information of the target eNB indicating the UE to use the resource of mode 1, the UE terminates use of the resource of mode 2, releases the resource pool of mode 2, and requests the target eNB for the resource of mode 1.

For example, when the UE performs failure reestablishment, after the UE receives the resource of mode 1 allocated by the eNB to which a connection is reestablished by the UE, the MAC layer will be configured with the resource of mode 1, and at the same time, the resource of mode 2 will be released; or, when the UE receives the indication information of the eNB to which a connection is reestablished by the UE indicating the UE to use the resource of mode 1, the UE terminates use of the resource of mode 2, releases the resource pool of mode 2, and requests the eNB to which a connection is reestablished by the UE for the resource of mode 1.

In this embodiment, if a time used by the UE in succeeding in handover is relatively short, in a relatively short process of handover, it is possible that the resource pool configured in the second mode is not used. Hence, the method may further include: when the UE is handed over to the second eNB unsuccessfully within a first predetermined time starting from the UE receives the configuration information, the second period includes a period from exceeding the first predetermined time until the first resource is received; wherein, the first predetermined time is shorter than a time from the UE receives the configuration information to succeeding in being connected to the second eNB.

In this embodiment, if a time used by the UE in a reestablishment process is relatively short, in a relatively short reestablishment process, it is possible that the resource pool configured in the second mode is not used. Hence, the method may further include: when the UE does not select an appropriate cell in a second predetermined time starting from initializing the reestablishment, the third period includes a period from exceeding the second predetermined time until the first resource is received; wherein, the second predetermined time is shorter than a time starting from initializing reestablishment to that an appropriate cell is selected.

In this embodiment, before the UE performs handover and is disconnected from the first eNB, the method may further includes: receiving the configuration information configured by the first eNB.

Wherein, the configuration information includes: a time-frequency location of the resource pool configured in the second mode by the second eNB, and/or information indicating whether the second eNB supports a resource allocation scheme in the first mode, and/or a resource location of a resource allocated in the first mode by the second eNB.

In this embodiment, when the UE performs handover, the first eNB may transmit a handover request to the second eNB according to a measurement result transmitted by the UE, the handover request including information on that the UE is performing D2D communication, and/or an allocation mode and a resource location of a D2D communication resource used by the UE; after receiving the configuration information fed back by the second eNB according to the handover request, the first eNB configures the UE with the configuration information, this is a reconfiguration process.

It can be seen from the resource selection method of this embodiment that the UE may use the resource selected from the resource pool configured by the first eNB or the second eNB in the second mode for communication in a prescribed period, which facilitates the UE to select a corresponding resource for the D2D communication in a handover or a failure reestablishment scenario.

The resource selection method shall be described in detail taking a handover scenario and a failure reestablishment scenario as examples, respectively.

Embodiment 2

Embodiment 2 of the present invention provides a resource selection method, regarding an implementation scenario where the UE performs inter-cell handover. The method includes: selecting by the UE a resource for performing D2D communication from a resource pool configured in a second mode by a source eNB or a target eNB after the UE is disconnected from the source eNB, in a second period from the UE receives configuration information triggering the UE to be connected to the target eNB to the UE receives a first resource allocated in a first mode by the target eNB.

In this embodiment, implementations of the first resource allocated in the first mode and the resource pool configured in the second mode are identical to those in Embodiment 1, and shall not be described herein any further.

FIG. 4A is a flowchart of the resource selection method of Embodiment 2. For a handover scenario, referring to FIG. 4A, the method includes:

Step 401: notifying a time-frequency position of the resource pool of mode 2 configured by the source eNB to the UE by the source eNB, and notifying the UE that it may use the resource of mode 1;

in this embodiment, the source eNB notifies the time-frequency position of the resource pool of mode 2 to the UE via broadcast or specific signaling, and/or the source eNB notify the UE via broadcast or specific signaling that it may apply for using the resource of mode 1.

Step 402: reporting a measurement result by the UE;

in this embodiment, the UE measures channel quality, such as reference signal receiving power (RSRP) and reference signal receiving quality (RSRQ), and report the measurement result to the source eNB.

Step 403: transmitting a handover request to the target eNB by the source eNB according to the measurement result;

in this embodiment, the handover request may include information on that the UE is performing D2D communication, and/or an allocation mode and a resource location of a D2D communication resource used by the UE.

Step 404: transmitting the configuration information to the source eNB by the target eNB after receiving the handover request;

in this embodiment, the configuration information may include the time-frequency position of the resource pool configured by the target eNB in mode 2, and/or information on whether the target eNB supports the resource allocation scheme in mode 1, and/or a resource location of a resource allocated in mode 1 by the target eNB.

Step 405: reconfiguring the UE by the source eNB after receiving the configuration information of the target eNB;

in this embodiment, the source eNB configures the UE with the configuration information;

wherein, any existing manner may be used for a manner of configuration, such as notifying the configuration information to the UE via high-layer signaling or other signaling.

Step 406: establishing a connection with the target eNB;

wherein, in the second period from the UE receives the configuration information to the UE receives the resource allocated in mode 1 by the target eNB, the UE selects the resource for D2D communication from the resource pool configured by the source eNB or the target eNB in mode 2;

in this embodiment, if the configuration information is configured via an RRC connection reconfiguration message, when the UE receives an RRC connection reconfiguration message containing a mobility control Info IE, it starts a T304 timer for timing, is disconnected from the source eNB, and establishes a connection with the target eNB via random access, and the T304 timer terminates the timing.

Step 407: transmitting a resource request by the UE to the target eNB.

Step 408: allocating the first resource by the target eNB to the UE.

Step 409: notifying the allocated resource by the target eNB to the UE, and the UE succeeding in receiving the first resource allocated by the target cell.

In this embodiment, in a time period from the T304 timer is started to the resource of mode 1 allocated by the target cell is successfully received (period T2), the UE selects the resource for D2D communication from the resource pool of mode 2, but does not use the resource of mode 1; wherein, an existing standard may be referred to for a particular setting method of T304, which shall not be described herein any further.

In an implementation, the UE may further set a first timer. In step 406, when the UE receives an RRC connection reconfiguration message containing a mobility control Info IE, it may start a first timer (T1') while starting the T304 timer. At a time period from the first timer expires to the resource of mode 1 allocated by the target eNB is successfully received (a time period T2'), the UE selects the resource for D2D communication from the resource pool of mode 2, but does not use the resource of mode 1; wherein, T1' is less than T304. It can be seen therefrom that when a time needed by the UE in being handed over to the target eNB is relatively short, the UE may not take the resource used in T' into account.

In this embodiment, the UE may use the resource pool of mode 2 configured by the source eNB or the target eNB, or the UE may select the resource for D2D communication from the resource pool configured by the target eNB after receiving the resource pool of mode 2 configured by the target eNB; and the UE may select the resource for D2D communication from the resource pool of mode 2 configured by the source eNB before receiving the resource pool of mode 2 configured by the target eNB.

As shown in FIG. 4A, the method further includes:

Step 410: terminating selection of resource for D2D communication from the resource pool of mode 2 by the UE after successfully receiving the resource of mode 1 allocated by the target eNB; and Step 411: releasing the resource pool of mode 2 by the UE after receiving the resource of mode 1 allocated by the target eNB;

wherein, after the UE receives the resource of mode 1 allocated by the target eNB, the MAC layer will be configured with the resource of mode 1, and at the same time, release the resource pool of mode 2.

Figure 4B:
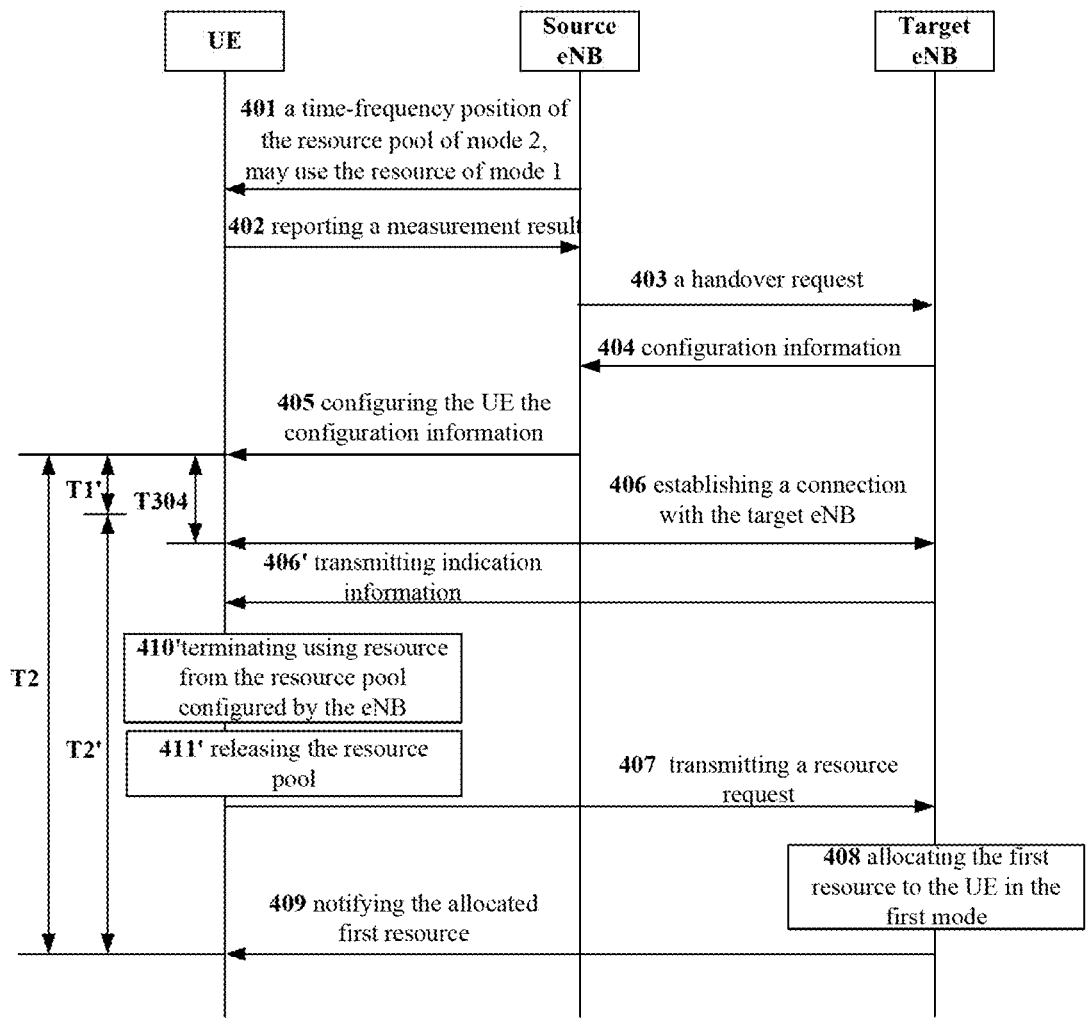

In another implementation, as shown in FIG. 4B, within the above time periods T2 and T2', after step 406, the UE receives the indication information transmitted by the target eNB indicating the UE to use the resource of mode 1 (see step 406'), terminates use of resource of mode 2, releases the resource pool of mode 2 (see steps 410' and 411'), and requests the target cell for the resource of mode 1 (see step 407).

In the above embodiment, orders of steps 410 and 411 and orders of steps 410' and 411' are interchangeable, or may be executed simultaneously.

It can be seen from the resource selection method of this embodiment that the UE may select the resource for D2D communication from the resource pool of mode 2 after receiving the reconfiguration information transmitted by the source eNB in the handover and before receiving the resource of mode 1 allocated by the target cell, so as to ensure continuity of D2D communication.

Embodiment 3

Embodiment 3 of the present invention provides a resource selection method, regarding an implementation scenario of failure reestablishment by the UE. In this embodiment, failures triggering an initialization reestablishment process mainly include: a radio link failure (RLF), a handover failure, an eNB reconfiguration failure, and an underlying integrity check failure, etc.

In this embodiment, implementations of the first resource allocated in the first mode and the resource pool configured in the second mode are identical to those of Embodiment 1, which shall not be described herein any further. And in this embodiment, the second eNB may be the first eNB, and may also be another eNB.

Figure 5A:
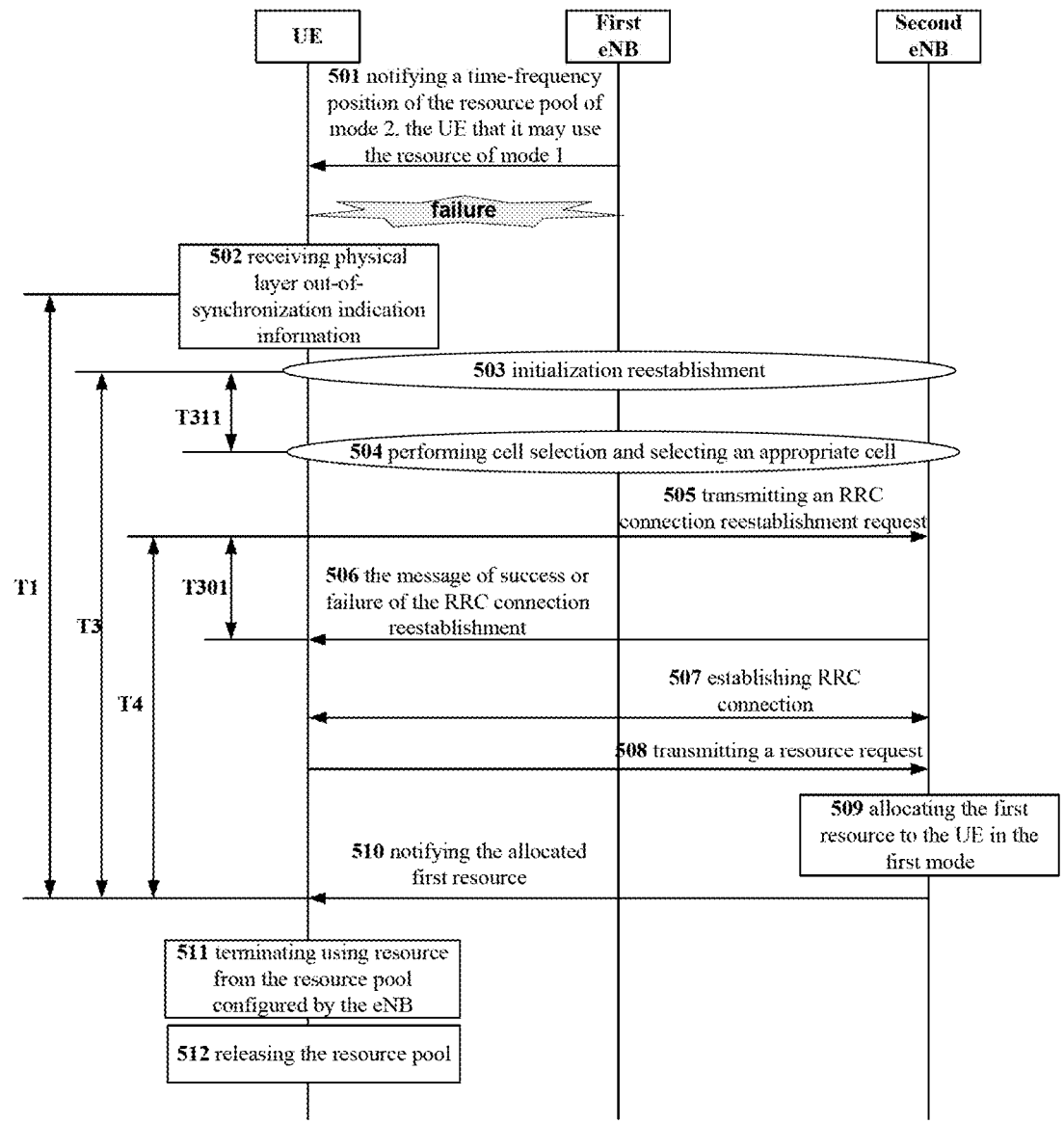
FIGS. 5A and 5B are flowcharts of the resource selection method of Embodiment 3 of the present invention.

FIG. 5A is a flowchart of the resource selection method of Embodiment 3. Referring to FIG. 5A, the method includes:

Step 501: notifying a time-frequency position of the resource pool of mode 2 configured by the first eNB to the UE by the first eNB, and notifying the UE that it may use the resource of mode 1;

in this embodiment, similar to step 401, the first eNB may notify the time-frequency position of the resource pool of mode 2 to the UE via broadcast or specific signaling, and/or the first eNB notify the UE via broadcast or specific signaling that it may apply for using the resource of mode 1.

Steps 503-505: triggering the initialization reestablishment process by the UE after a failure occurs, and transmitting an RRC connection reestablishment request after selecting an appropriate cell;

in this embodiment, starting from triggering the initialization reestablishment, a timer T311 is started for timing, the appropriate cell is selected, such as a cell of the second eNB, and the timer T311 is terminated.

Step 506: receiving by the UE a message of success or failure of the RRC connection reestablishment fed back by the second eNB;

in this embodiment, when the UE transmits the RRC connection reestablishment request to the second eNB, the timer T301 may be started for timing, and the timer T301 is terminated until the message of success or failure of the RRC connection reestablishment fed back by the second eNB is received;

when a message of success of connection reestablishment is received, the UE establishes a connection with the second eNB; and if a message of failure of connection reestablishment is received, reestablishment of the UE fails, but the UE may still execute step 505 to transmit the connection establishment request and establish a connection with the second eNB. Step 507: establishing RRC connection successfully by the UE with the second eNB;

In this embodiment, a process of establishing the RRC connection is similar to that in the prior art, which shall be described herein in brief. First, cell selection is performed; the UE transmits the RRC connection request to the selected second eNB; the second eNB feeds back the RRC connection establishment message to the UE after receiving the RRC connection request; after receiving the RRC connection establishment message, the UE transmits an RRC connection establishment completion message to the second eNB, thereby successfully establishing the connection between the UE and the second eNB.

In the above embodiment, the cell selected in the reestablishment initialization process in step 503 may be identical to or different from the cell selected in step 507, that is, the second eNBs may be identical or different. Steps 508-512 are similar to steps 407-411 of Embodiment 2 shown in FIG. 4A, which shall not be described herein any further.

In this embodiment, for a scenario of a radio link failure, the method further includes:

Step 502: receiving physical layer out-of-synchronization indication information;

wherein, after the physical layer out-of-synchronization indication information is received, the timer T310 may be started for timing, and the timer T310 is terminated when the physical layer synchronization indication information has been received, or the handover process is triggered, or the reestablishment initialization process is started.

In the above embodiment, for the radio link failure, the UE selects the resource for D2D communication from the resource pool of mode 2 in the period from T310 is started to the UE successfully receives the resource of mode 1 allocated by the eNB to which a connection is successfully reestablished (period T1), but does not use the resource of mode 1.

For the scenario of handover failure, similar to the case in Embodiment 2, when the UE receives the configuration information configured by the first eNB, the timer T304 is started, the UE is handed over to the second eNB and the handover fails. After the handover failure, the UE establishes a connection with the second eNB via the reestablishment initialization process and the reestablishment connection process (such as steps 503-507 shown in FIG. 5). Hence, the UE selects the resource for D2D communication from the resource pool of mode 2 in the period from T304 is started to the UE successfully receives the resource of mode 1 allocated by an eNB (such as the second eNB) of a cell to which a connection is reestablished (period T2), but does not use the resource of mode 1.

In step 503, the UE selects the resource for D2D communication from the resource pool of mode 2 in the period from the reestablishment initialization is triggered and the timer T311 is started to the UE successfully receives the resource of mode 1 allocated by the cell to which a connection is reestablished (period T3), but does not use the resource of mode 1.

In step 505, the UE selects the resource for D2D communication from the resource pool of mode 2 in the period from the RRC connection reestablishment request is transmitted to the UE successfully receives the resource of mode 1 allocated by the cell to which a connection is reestablished (period T4), but does not use the resource of mode 1.

For failures resulted from eNB reconfiguration failure, and underlying integrity check failure, etc., the UE selects the resource for D2D communication from the resource pool of mode 2 in the period from the UE initiates the reestablishment initialization process and the timer T311 is started to the UE successfully receives the resource of mode 1 allocated by the cell to which a connection is reestablished (T3), but does not use the resource of mode 1.

In this embodiment, the UE may further set a second timer (T2"), which is started when the reestablishment initialization is started. In a period from the second timer expires to the UE successfully receives the resource of mode 1 allocated by the cell to which a connection is reestablished (T3'), the UE selects the resource for D2D communication from the resource pool of mode 2, but does not use the resource of mode 1; wherein, T2" is less than T311.

In this embodiment, existing standards may be referred to for implementations of the timers T310, T304, 311 and T301, which shall not be described herein any further.

Figure 5B:
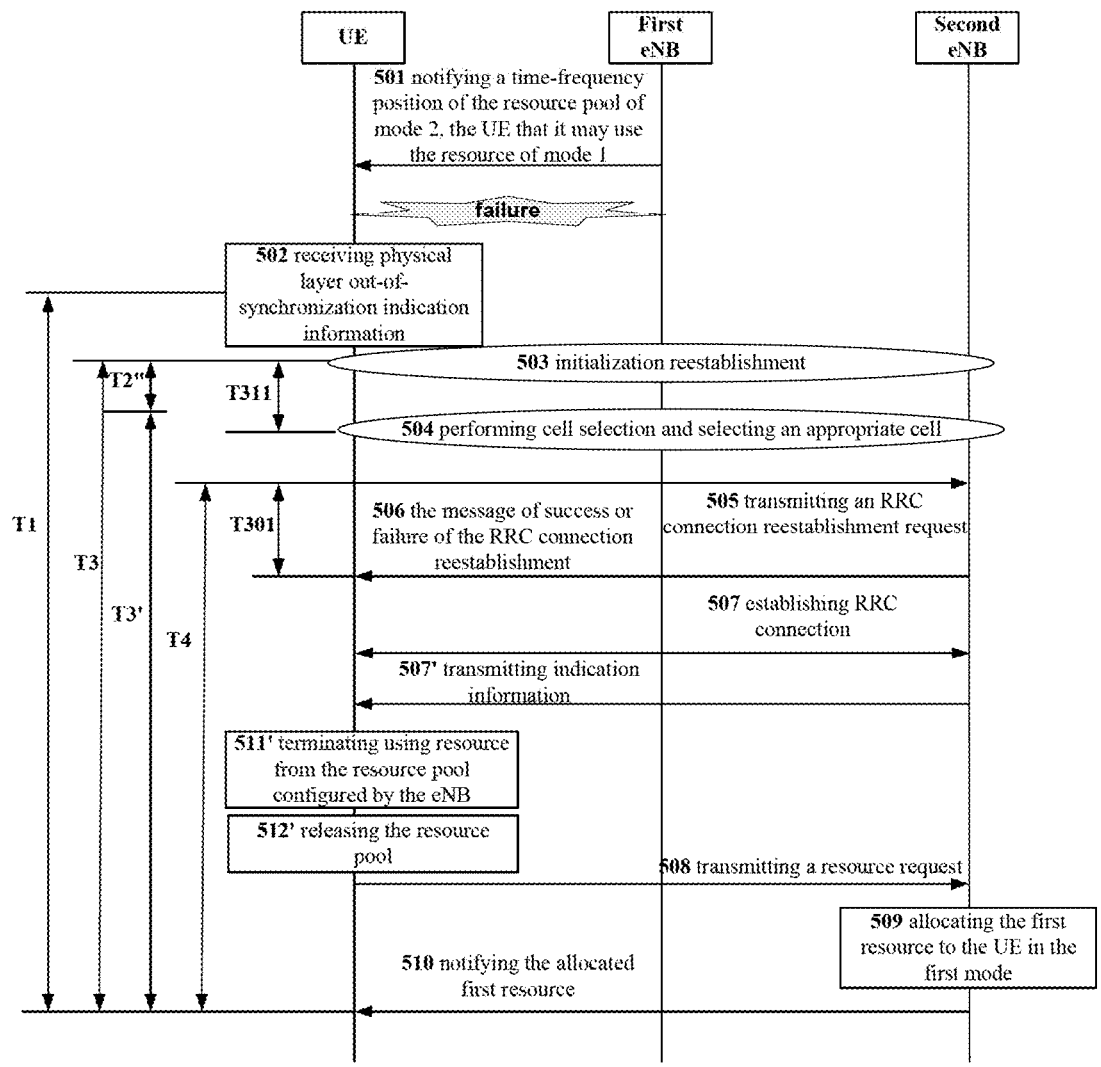

In another embodiment, as shown in FIG. 5B, within the above periods T1, T2, T3, T3' and T4, the UE receives the indication information transmitted by the target eNB indicating the UE to use the resource of mode 1 (see step 507'), terminates use of resource of mode 2, releases the resource pool of mode 2 (see steps 511' and 512'), and requests the target cell for the resource mode 1 (see step 508). In the above embodiment, orders of steps 511 and 512 and orders of steps 511' and 512' are interchangeable, or may be executed simultaneously.

In steps 407 and 508 of Embodiment 2 and Embodiment 3, before the UE transmits the resource request to the target eNB, the method may further include: judging whether the received configuration information contains the resource of mode 1; and executing steps 407 and 508 by the UE when the configuration information does not contain the resource of mode 1, that is, transmitting a request for the resource of mode 1 to the target eNB.

In the above embodiment, the UE may use the resource pool of mode 2 configured by the eNB in which a failure occurs (the first eNB) or the eNB to which a connection is reestablished (the second eNB); or, after receiving the resource pool of mode 2 configured by the eNB to which a connection is reestablished, the UE selects the resource for D2D communication from the resource pool configured by the eNB to which a connection is reestablished; and before receiving the resource pool of mode 2 configured by the eNB to which a connection is reestablished, the UE selects the resource for D2D communication from the resource pool of mode 2 configured by the eNB in which a failure occurs.

It can be seen from the resource selection method of this embodiment that the UE may use the resource selected from the resource pool configured by the first eNB or the second eNB in the second mode for communication in a prescribed period, which facilitates the UE to select a corresponding resource for the D2D communication in a failure reestablishment scenario, so as to ensure continuity of the D2D communication.

Embodiment 4

Embodiment 4 of the present invention provides a resource selection apparatus, as described in Embodiment 4 below. As a principle of the resource selection apparatus for solving problems is similar to those of the methods of embodiments 1-3, the implementations of the methods of embodiments 1-3 may be referred to for a particular implementation of the apparatus, with identical contents being not going to be described herein any further.

Figure 6:
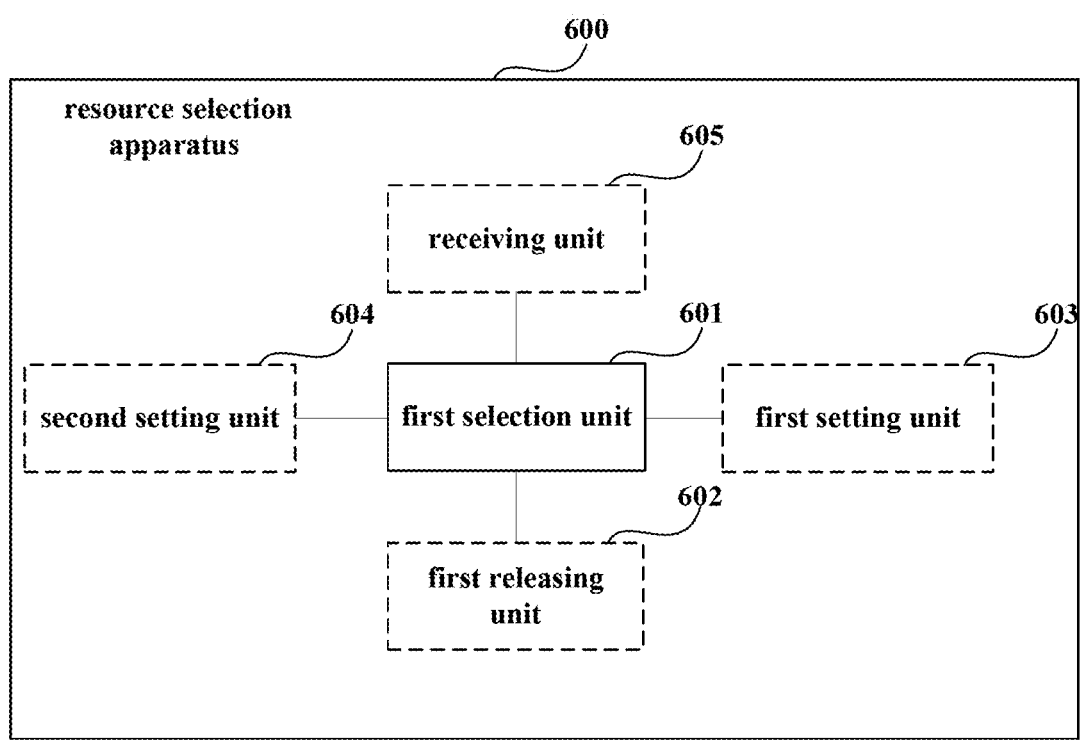
FIG. 6 is a schematic diagram of a structure of the resource selection apparatus of Embodiment 4 of the present invention.

FIG. 6 is a schematic diagram of a structure of the resource selection apparatus of Embodiment 4 of the present invention. As shown in FIG. 6, the apparatus 600 includes:

a first selection unit 601 configured to select a resource for performing device to device (D2D) communication from a resource pool configured in a second mode by a first eNB or a second eNB after user equipment (UE) is disconnected from the first eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE.

In this embodiment, the first eNB and the second eNB, and the first mode and second mode for allocating resources, are as described in embodiments 1-3, and shall not be described herein any further.

In this embodiment, when the failure of triggering the initialization reestablishment process by the UE is a radio link failure (RLF), the first selection unit 601 selects the resource for D2D communication from the resource pool configured by the first eNB or the second eNB in the second mode in the first period from the UE receives the physical layer out-of-synchronization indication information to the UE receives the first resource allocated in the first mode by the second eNB reestablishing a connection with the UE, but does not use the first resource configured by the eNB in the first mode.

In this embodiment, when the UE is handed over or the failure of triggering the initialization reestablishment process by the UE is a handover failure, the first selection unit 601 selects the resource for D2D communication from the resource pool configured by the first eNB or the second eNB in the second mode in the second period from the UE receives the configuration information triggering the UE to be handed over to the second eNB to the UE receives the first resource allocated in the first mode by the second eNB, but does not use the first resource configured by the eNB in the first mode.

In this embodiment, when the failure of triggering the initialization reestablishment process by the UE is an eNB reconfiguration failure, an underlying integrity check failure, or a handover failure, the first selection unit 601 selects the resource for D2D communication from the resource pool configured by the first eNB or the second eNB in the second mode in the third period from the UE initializes the reestablishment to the UE receives the first resource allocated in the first mode by the second eNB reestablishing a connection with the UE, but does not use the first resource configured by the eNB in the first mode.

In this embodiment, when the failure of triggering the initialization reestablishment process by the UE is a handover failure, the first selection unit 601 selects the resource for D2D communication from the resource pool configured by the first eNB or the second eNB in the second mode in the fourth period from the UE transmits the reestablishment request to the UE receives the first resource allocated in the first mode by the second eNB reestablishing a connection with the UE, but does not use the first resource configured by the eNB in the first mode.

It can be seen from the resource selection apparatus of this embodiment that the UE may use the resource selected from the resource pool configured by the first eNB or the second eNB in the second mode for communication in the first period, the second period, the third period or the fourth period, which facilitates the UE to select a corresponding resource for the D2D communication in a handover or a failure reestablishment scenario, so as to ensure continuity of the D2D communication.

In this embodiment, the first selection unit 601 selects the resource for performing the D2D communication from a resource pool configured in a second mode by the second eNB, after the UE receives the resource pool configured in the second mode by the second eNB; and selects the resource for performing the D2D communication from the resource pool configured in the second mode by the first eNB, before the UE receives the resource pool configured in the second mode by the second eNB.

In an implementation, when the UE performs inter-cell handover, the first selection unit 601 may select the resource in the resource pool of mode 2 configured by the source eNB or the target eNB; or after the UE receives the resource pool of mode 2 configured by the target eNB, the first selection unit 601 selects the resource for D2D communication from the resource pool configured by the target eNB; and before the UE receives the resource pool of mode 2 configured by the target eNB, the first selection unit 601 selects the resource for D2D communication from the resource pool of mode 2 configured by the source eNB.

In an implementation, when the UE performs failure reestablishment, the first selection unit 601 may use the resource pool of mode 2 configured by the eNB where the failure occurs or the eNB to which a connection is reestablished successfully by the UE; or after the UE receives the resource pool of mode 2 configured by the eNB to which a connection is reestablished successfully by the UE, the first selection unit 601 selects the resource for D2D communication from the resource pool configured by the eNB to which a connection is reestablished successfully by the UE; and before the UE receives the resource pool of mode 2 configured by the eNB to which a connection is reestablished successfully by the UE, the first selection unit 601 selects the resource for D2D communication from the resource pool of mode 2 configured by the eNB where the failure occurs.

In this embodiment, the apparatus 600 further includes:

a first releasing unit 602 configured to release the resource pool after the UE receives the first resource allocated in the first mode by the second eNB, or when the UE receives from the second eNB indication information indicating the UE to use the first resource.

In an implementation, when the UE performs inter-cell handover, after the UE receives the resource of mode 1 allocated by the target eNB, the MAC layer will be configured with the resource of mode 1, and the first releasing unit 602 releases the resource of mode 2; or, when the UE receives the indication information of the target eNB indicating the UE to use the resource of mode 1, the use of the resource of mode 2 is terminated, the first releasing unit 602 releases the resource of mode 2, and requests the target cell for the resource of mode 1.

In an implementation, when the UE performs failure reestablishment, after the UE receives the resource of mode 1 allocated by the eNB to which a connection is reestablished successfully by the UE, the MAC layer will be configured with the resource of mode 1, and the first releasing unit 602 releases the resource of mode 2; or, when the UE receives the indication information of the eNB to which a connection is reestablished successfully by the UE indicating the UE to use the resource of mode 1, the use of the resource of mode 2 is terminated, the first releasing unit 602 releases the resource pool of mode 2, and requests the eNB to which a connection is reestablished successfully by the UE for the resource of mode 1.

In this embodiment, if a time used by the UE in succeeding in handover is relatively short, in a relatively short process of handover, it is possible that the resource pool configured in the second mode is not used. Hence, the apparatus 600 may further include:

a first setting unit 603 configured to set a first predetermined time, the first predetermined time being shorter than a time from the UE receives the configuration information to the UE is connected successfully to the second eNB;

and when the UE is handed over to the second eNB unsuccessfully within the first predetermined time starting from the UE receives the configuration information, the second period includes a period from exceeding the first predetermined time until the first resource is received.

In this embodiment, if a time used by the UE in a reestablishment process is relatively short, in a relatively short reestablishment process, it is possible that the resource pool configured in the second mode is not used. Hence, the apparatus 600 may further include:

a second setting unit 604 configured to set a second predetermined time, the second predetermined time being shorter than a time from the UE initializes the reestablishment to the UE selects an appropriate cell;

and when the UE does not select an appropriate cell in the second predetermined time starting from initializing the reestablishment, the third period includes a period from exceeding the second predetermined time until the first resource is received.

In this embodiment, the apparatus may further include:

a receiving unit 605 configured to receive configuration information reconfigured by the first eNB;

wherein, the configuration information includes: a time-frequency location of the resource pool configured in the second mode by the second eNB, and/or information indicating whether the second eNB supports a resource allocation scheme in the first mode, and/or a resource location of a resource allocated in the first mode by the second eNB.

In this embodiment, the first releasing unit 602, the first setting unit 603, the second setting unit 604 and the receiving unit 605 are optional.

In this embodiment, the first period, the second period, the third period and the fourth period are as described in embodiments 1-3, and shall not be described herein any further.

It can be seen from the above resource selection apparatus of this embodiment that the UE may use the resource selected from the resource pool configured by the first eNB or the second eNB in the second mode for communication in a prescribed period, which facilitates the UE to select a corresponding resource for the D2D communication in a handover scenario or a failure reestablishment scenario, so as to ensure continuity of the D2D communication.

Embodiment 5

Embodiment 5 of the present invention provides UE, including the resource selection apparatus as described in Embodiment 4.

Figure 7:
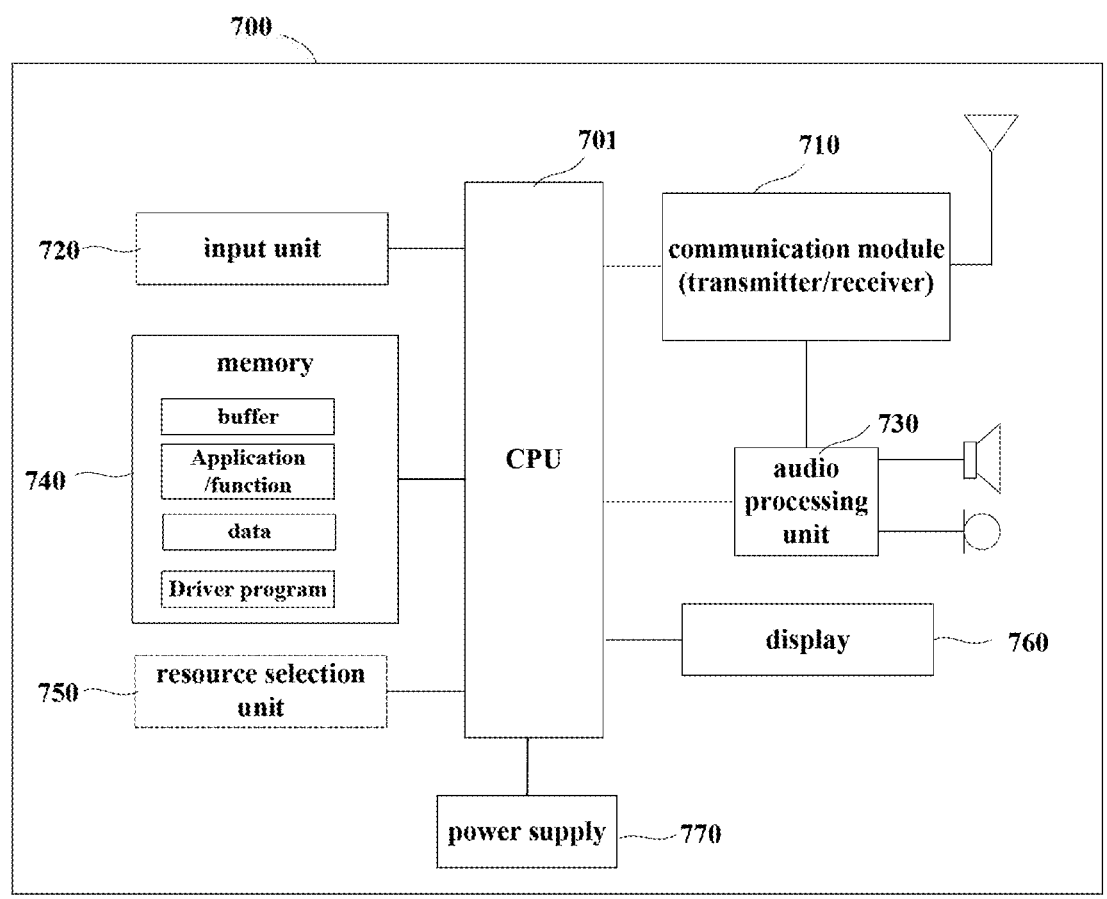
FIG. 7 is a schematic diagram of a structure of the UE of Embodiment 5 of the present invention.

FIG. 7 is a block diagram of a structure of the UE 700 of the embodiment of the present invention. As shown in FIG. 7, the UE 700 may include a central processing unit 701 and a memory 740, the memory 740 being coupled to the central processing unit 701. It should be noted that this figure is illustrative only, and other types of structures may also be used, so as to supplement or replace this structure and achieve telecommunications function or other functions.

In an implementation, the functions of the resource selection apparatus may be integrated into the central processing unit 701. Wherein, the central processing unit 701 may be configured to:

select a resource for performing device to device (D2D) communication from a resource pool configured in a second mode by a first eNB or a second eNB after user equipment (UE) is disconnected from the first eNB, in a first period from the UE receives physical layer out-of-synchronization indication information to the UE receives a first resource allocated in a first mode by the second eNB reestablishing a connection with the UE, or in a second period from the UE receives configuration information triggering the UE to be handed over to the second eNB to the UE receives a first resource allocated in a first mode by the second eNB, or in a third period from the UE initializes reestablishment to the UE receives a first resource allocated in a first mode by the second eNB reestablishing a connection with the UE, or in a fourth period from the UE transmits a reestablishment request to the UE receives a first resource allocated in a first mode by the second eNB reestablishing a connection with the UE.

Wherein the first resource allocated in the first mode and the resource pool configured in the second mode are as described in embodiments 1-4, and shall not be described herein any further.

In an implementation, the central processing unit 701 may be configured to: select the resource for performing the communication from a resource pool configured in a second mode by the second eNB, after the UE receives the resource pool configured in the second mode by the second eNB; and select the resource for performing the communication from a resource pool configured in the second mode by the first eNB, before the UE receives the resource pool configured in the second mode by the second eNB.

In an implementation, the central processing unit 701 may be configured to: release the resource pool after the UE receives the first resource allocated in the first mode by the second eNB, or when the UE receives from the second eNB indication information indicating the UE to use the first resource.

In an implementation, the central processing unit 701 may be configured to: when the UE is handed over to the second eNB unsuccessfully within a first predetermined time starting from the UE receives the configuration information, the second period includes a period from exceeding the first predetermined time until the first resource is received;

the first predetermined time is shorter than a time from the UE receives the configuration information to succeeding in being connected to the second eNB.

In an implementation, the central processing unit 701 may be configured to: when the UE does not select an appropriate cell in a second predetermined time starting from initializing the reestablishment, the third period includes a period from exceeding the second predetermined time until the first resource is received;

the second predetermined time is shorter than a time starting from reestablishment initialization to that an appropriate cell is selected.

In another implementation, the resource selection apparatus and the central processing unit 701 may be configured separately. For example, the resource selection apparatus may be configured as a chip connected to the central processing unit 701 (such as a resource selecting unit 750), with its functions being realized under control of the central processing unit.

As shown in FIG. 7, the UE 700 may further include a communication module 710, an input unit 720, an audio processing unit 730, a display 760 and a power supply 770. It should be noted that the UE 700 does not necessarily include all the parts shown in FIG. 7. And furthermore, the UE 700 may include components not shown in FIG. 7, and the prior art may be referred to.

As shown in FIG. 7, the central processing unit 701 is sometimes referred to as a controller or control, and may include a microprocessor or other processor devices and/or logic devices. The central processing unit 701 receives input and controls operations of every components of the UE 700.

Wherein, the memory 740 may be, for example, one or more of a buffer memory, a flash memory, a hard drive, a mobile medium, a volatile memory, a nonvolatile memory, or other suitable devices, which may store the above information on failures. Furthermore, it may store programs executing related information. And the central processing unit 701 may execute the programs stored in the memory 740, so as to realize configuration information and reconfiguration information storage, etc. Functions of other parts are similar to those of the prior art, which shall not be described herein any further. The parts of the UE 700 may be realized by specific hardware, firmware, software, or any combination thereof, without departing from the scope of the present invention.

It can be seen from the above UE of this embodiment that the UE may use the resource selected from the resource pool configured by the first eNB or the second eNB in the second mode for communication in a prescribed period, which facilitates the UE to select a corresponding resource for the D2D communication in a handover scenario or a failure reestablishment scenario, so as to ensure continuity of the D2D communication.

Embodiment 6

Figure 8:
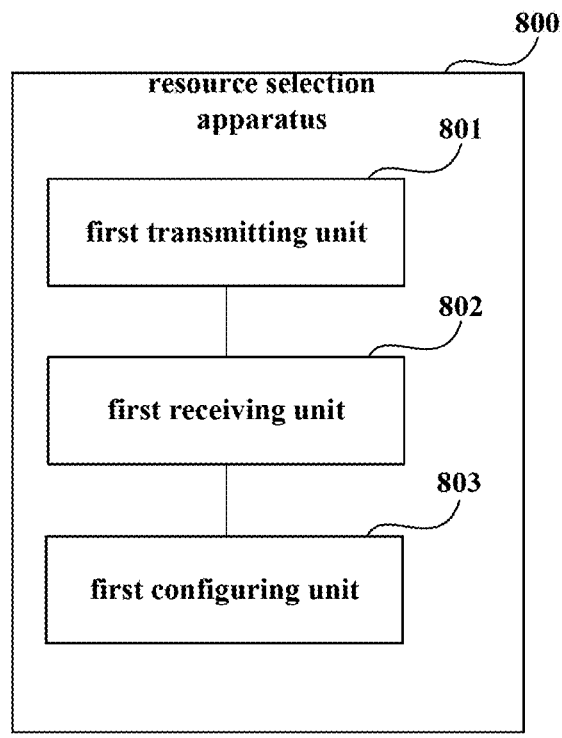
FIG. 8 is a schematic diagram of a structure of the resource selection apparatus of Embodiment 6 of the present invention.

Embodiment 6 of the present invention provides a resource selection apparatus. FIG. 8 is a schematic diagram of a structure of the resource selection apparatus of this embodiment. As shown in FIG. 8, the resource selection apparatus 800 includes:

a first transmitting unit 801 configured to transmit a handover request to a second eNB according to a measurement result transmitted by UE, the handover request including information on that the UE is performing D2D communication, and/or an allocation mode and a resource location of a D2D communication resource used by the UE;

a first receiving unit 802 configured to receive configuration information fed back by the second eNB according to the handover request, the configuration information including a time-frequency location of a resource pool configured in a second mode by the second eNB, and/or information indicating whether the second eNB supports a resource allocation scheme in a first mode, and/or a resource location of a resource allocated in the first mode by the second eNB; and a first configuring unit 803 configured to reconfigure the configuration information for the UE.

By reconfiguring the configuration information by the resource selection apparatus for the UE, the UE may use the resource selected from the resource pool configured by the first eNB or the second eNB in the second mode for communication in a prescribed period, which facilitates the UE to select a corresponding resource for the D2D communication in a handover scenario or a failure reestablishment scenario, so as to ensure continuity of the D2D communication.

Embodiment 7

Embodiment 7 of the present invention provides an eNB, including the resource selection apparatus as described in Embodiment 6.

Figure 9:
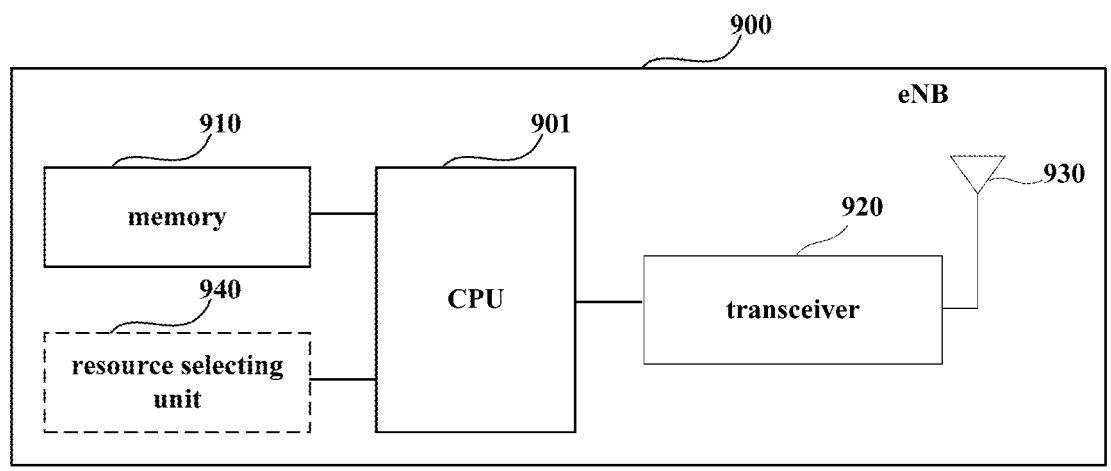
FIG. 9 is a schematic diagram of a structure of the eNB of Embodiment 7 of the present invention.

FIG. 9 is a block diagram of a structure of the eNB of the embodiment of the present invention. As shown in FIG. 9, the eNB 900 may include a central processing unit (CPU) 901 and a memory 910, the memory 910 being coupled to the central processing unit 901. Wherein, the memory 910 may store various data, and furthermore, it may store programs for resource selection, and execute the programs under control of the central processing unit 901, so as to receive a measurement result transmitted by the UE, etc., and transmit configuration information, etc., to the UE.

In an implementation, the functions of the resource selection apparatus may be integrated into the central processing unit 901. Wherein, the central processing unit 901 may be configured to: transmit a handover request to a second eNB according to a measurement result transmitted by UE, the handover request including information on that the UE is performing D2D communication, and/or an allocation mode and a resource location of a D2D communication resource used by the UE; receive configuration information fed back by the second eNB according to the handover request, the configuration information including a time-frequency location of a resource pool configured in a second mode by the second eNB, and/or information indicating whether the second eNB supports a resource allocation scheme in a first mode, and/or a resource location of a resource allocated in the first mode by the second eNB; and reconfigure the configuration information for the UE.

In another implementation, the resource selection apparatus and the central processing unit may be configured separately. For example, the resource selection apparatus may be configured as a chip connected to the central processing unit 901 (such as a resource selecting unit 940), with its functions being realized under control of the central processing unit. Furthermore, as shown in FIG. 9, the eNB 900 may further include a transceiver 920, and an antenna 930, etc.; wherein, functions of the above components are similar to those in the prior art, and shall not be described herein any further. It should be noted that the eNB 900 does not necessarily include all the parts shown in FIG. 9. And furthermore, the eNB 900 may include components not shown in FIG. 9, and the prior art may be referred to.

By reconfiguring the configuration information by the eNB of this embodiment for the UE, the UE may use the resource selected from the resource pool configured by the first eNB or the second eNB in the second mode for communication in a prescribed period, which facilitates the UE to select a corresponding resource for the D2D communication in a handover scenario or a failure reestablishment scenario, so as to ensure continuity of the D2D communication.

Embodiment 8

Figure 10:
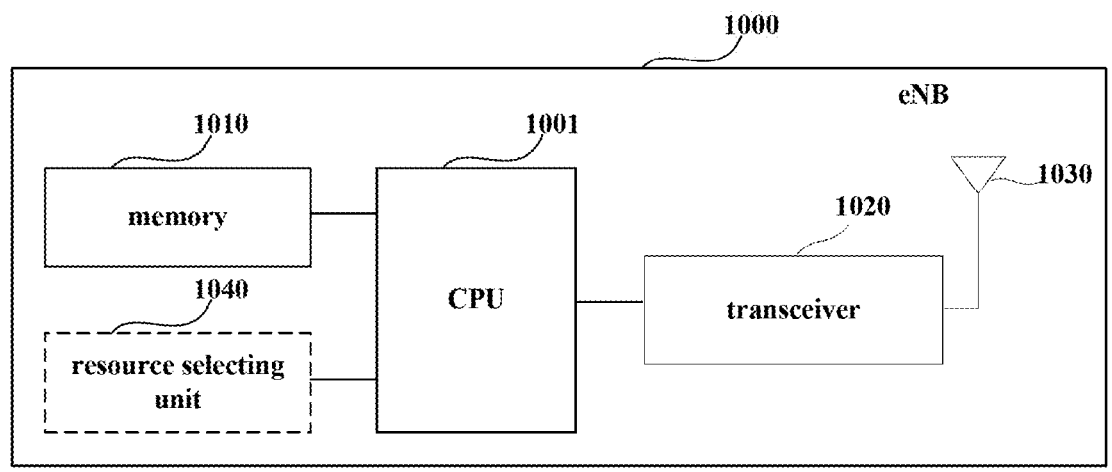
FIG. 10 is a schematic diagram of a structure of the eNB of Embodiment 8 of the present invention.

Embodiment 8 of the present invention provides an eNB. FIG. 10 is a schematic diagram of a structure of the eNB of the embodiment of the present invention. As shown in FIG. 10, the eNB 1000 may include a central processing unit (CPU) 1001 and a memory 1010, the memory 1010 being coupled to the central processing unit 1001. Wherein, the memory 1010 may store various data, and furthermore, it may store programs for resource selection, and execute the programs under control of the central processing unit 1001, so as to receive a handover request transmitted by the source eNB, etc., and transmit configuration information, etc., to the source eNB.

In an implementation, the central processing unit 1001 may be configured to: receive a handover request transmitted by a first eNB, the handover request including information on that the UE is performing D2D communication, and/or an allocation mode and a resource location of a D2D communication resource used by the UE, and feed back configuration information according to the handover request, the configuration information including a time-frequency location of a resource pool configured in a second mode by the second eNB, and/or information indicating whether the second eNB supports a resource allocation scheme in a first mode, and/or a resource location of a resource allocated in the first mode by the second eNB.

In an implementation, the central processing unit 1001 may further be configured to: notify the UE of a first resource allocated by the second eNB in the first mode.

In an implementation, the central processing unit 1001 may further be configured to: transmit indication information indicating the UE to use the first resource allocated by the second eNB in the first mode, so that the UE releases the resource pool.

In another implementation, the resource selection apparatus and the central processing unit may be configured separately. For example, the resource selection apparatus may be configured as a chip connected to the central processing unit 1001 (such as a resource selecting unit 1040), with its functions being realized under control of the central processing unit. Furthermore, as shown in FIG. 10, the eNB 1000 may further include a transceiver 1020, and an antenna 1030, etc.; wherein, functions of the above components are similar to those in the prior art, and shall not be described herein any further. It should be noted that the eNB 1000 does not necessarily include all the parts shown in FIG. 10. And furthermore, the eNB 1000 may include components not shown in FIG. 10, and the prior art may be referred to.

With the eNB of this embodiment, the UE may use the resource selected from the resource pool configured by the first eNB or the second eNB in the second mode for communication in a prescribed period, which facilitates the UE to select a corresponding resource for the D2D communication in a handover scenario or a failure reestablishment scenario, so as to ensure continuity of the D2D communication.

Embodiment 9

Figure 11:
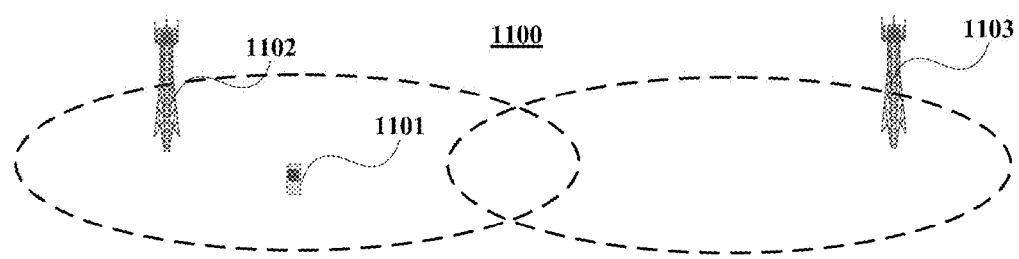
FIG. 11 is a schematic diagram of a structure of the communication system of Embodiment 9 of the present invention.

FIG. 11 is a schematic diagram of a structure of the communication system of Embodiment 9 of the present invention. As shown in FIG. 11, the communication system 1100 includes UE 1101, a first eNB 1102 and a second eNB 1103, wherein, after the UE 1101 is disconnected from the first eNB 1102, the UE 1101 selects a resource for performing D2D communication from a resource pool configured in a second mode by the first eNB 1102 or the second eNB 1103, in a first period from the UE 1101 receives physical layer out-of-synchronization indication information to the UE receives a first resource allocated in a first mode by the second eNB 1103 reestablishing a connection with the UE, or in a second period from the UE 1101 receives configuration information triggering the UE 1101 to be handed over to the second eNB 1103 to the UE 1101 receives a first resource allocated in a first mode by the second eNB 1103, or in a third period from the UE 1101 initializes reestablishment to the UE 1101 receives a first resource allocated in a first mode by the second eNB 1103 reestablishing a connection with the UE 1101, or in a fourth period from the UE 1101 transmits a reestablishment request to the UE 1101 receives a first resource allocated in a first mode by the second eNB 1103 reestablishing a connection with the UE 1101.

In this embodiment, allocating the first resource in the first mode and allocating the resource pool in the second mode by the eNBs are as described in the above embodiments, and shall not be described herein any further.

In this embodiment, when the failure of triggering the initialization reestablishment process is a radio link failure (RLF), the UE 1101 selects the resource for D2D communication from the resource pool configured by the first eNB or the second eNB in the second mode in the first period (T1) from the UE 1101 receives the physical layer out-of-synchronization indication information to the UE receives the first resource allocated in the first mode by the second eNB reestablishing a connection with the UE 1101, but does not use the first resource configured by the eNB in the first mode.

In this embodiment, when the failure of triggering the initialization reestablishment process is a handover failure, the UE 1101 selects the resource for D2D communication from the resource pool configured by the first eNB or the second eNB in the second mode in the second period (T2) from the UE 1101 receives the configuration information triggering the UE 1101 to be connected to the second eNB to the UE 1101 receives the first resource allocated in the first mode by the second eNB, but does not use the first resource configured by the eNB in the first mode.

In this embodiment, when the failure of triggering the initialization reestablishment process is an eNB reconfiguration failure, an underlying integrity check failure, or a handover failure, the UE 1101 selects the resource for D2D communication from the resource pool configured by the first eNB or the second eNB in the second mode in the third period (T3) from the UE 1101 initializes the reestablishment to the UE 1101 receives the first resource allocated in the first mode by the second eNB reestablishing a connection with the UE 1101, but does not use the first resource configured by the eNB in the first mode.

In this embodiment, when the failure of triggering the initialization reestablishment process is a handover failure, the UE 1101 selects the resource for D2D communication from the resource pool configured by the first eNB or the second eNB in the second mode in the fourth period (T4) from the UE 1101 transmits the reestablishment request to the UE 1101 receives the first resource allocated in the first mode by the second eNB reestablishing a connection with the UE 1101, but does not use the first resource configured by the eNB in the first mode.

After the UE receives the configuration information triggering the UE to be connected to the second eNB, the UE 1101 is disconnected from the first eNB, and establishes a connection with the second eNB via a random access process. The UE 1101 selects the resource for D2D communication from the resource pool configured by the first eNB or the second eNB in the second mode in the second period (T2) from the UE 1101 receives the configuration information triggering the UE 1101 to be connected to the second eNB to the UE receives the first resource allocated in the first mode by the second eNB, but does not use the first resource configured by the eNB in the first mode.

After receiving the resource pool configured by the second eNB in the second mode, the UE 1101 selects the resource for D2D communication from the resource pool configured by the second eNB; and before receiving the resource pool configured by the second eNB in the second mode, the UE 1101 selects the resource for D2D communication from the resource pool configured by the first eNB in the second mode.

In this embodiment, after receiving the first resource allocated by the second eNB in the first mode, or when receiving the indication information of the second eNB indicating the UE to use the first resource, the UE 1101 releases the resource pool.

In this embodiment, if a time used by the UE 1101 in succeeding in handover is relatively short, in a relatively short process of handover, it is possible that the resource pool configured in the second mode is not used. Hence, the method may further include: when the UE 1101 is handed over to the second eNB unsuccessfully within a first predetermined time starting from the UE 1101 receives the reconfiguration information, the second period includes a period from exceeding the first predetermined time until the first resource is received; wherein, the first predetermined time is shorter than a time from the UE 1101 receives the configuration information to succeeding in being connected to the second eNB.

In this embodiment, if a time used by the UE 1101 in a reestablishment process is relatively short, in a relatively short reestablishment process, it is possible that the resource pool configured in the second mode is not used. Hence, the method may further include: when the UE 1101 does not select an appropriate cell within a second predetermined time starting from initializing the reestablishment, the third period includes a period from exceeding the second predetermined time until the first resource is received; wherein, the second predetermined time is shorter than a time starting from reestablishment initialization to that an appropriate cell is selected. In this embodiment, Embodiment 5 may be referred to for a construction of the UE 1101, the contents of which being incorporated herein, and being not going to be described herein any further.

In this embodiment, the first eNB 1102 is further configured to transmit a handover request to the second eNB 1103 according to a measurement result transmitted by UE, the handover request including information on that the UE is performing D2D communication, and/or an allocation mode and a resource location of a D2D communication resource used by the UE, and receive configuration information fed back by the second eNB 1103 according to the handover request, the configuration information including a time-frequency location of a resource pool configured in a second mode by the second eNB 1103, and/or information indicating whether the second eNB supports a resource allocation scheme in a first mode, and/or a resource location of a resource allocated in the first mode by the second eNB 1103.

In this embodiment, the first eNB 1102 is further configured to configure the configuration information for the UE 1101.

In this embodiment, Embodiment 7 may be referred to for a construction of the eNB 1102, the contents of which being incorporated herein, and being not going to be described herein any further.

In this embodiment, the second eNB 1103 is further configured to receive the handover request transmitted by the first eNB 1102, the handover request including information on that the UE 1101 is performing D2D communication, and/or an allocation mode and a resource location of a D2D communication resource used by the UE 1101, and feed back the configuration information to the first eNB 1102 according to the handover request, the configuration information including a time-frequency location of a resource pool configured in a second mode by the second eNB 1103, and/or information indicating whether the second eNB 1103 supports a resource allocation scheme in a first mode, and/or a resource location of a resource allocated in the first mode by the second eNB 1103.

In this embodiment, the second eNB 1103 is further configured to notify the resource allocated in the first mode to the UE 1101.

In this embodiment, the second eNB 1103 is further configured to transmit indication information indicating the UE 1101 to use the first resource allocated in the first mode, so that the UE 1101 releases the resource pool.

In this embodiment, Embodiment 8 may be referred to for a construction of the second eNB 1103, the contents of which being incorporated herein, and being not going to be described herein any further.

In this embodiment, the communication system may further include other UE (not shown), and the UE 1101 uses the resource of mode within the above prescribed periods for performing D2D communication with the other UE.

An embodiment of the present invention provides a computer-readable program, wherein when the program is executed in a resource selection apparatus or UE, the program enables a computer to carry out the resource selection method as described in Embodiment 1 or 2 or 3 in the apparatus or UE.

An embodiment of the present invention further provides a storage medium in which a computer-readable program is stored, wherein the computer-readable program enables a computer to carry out the resource selection method as described in Embodiment 1 or 2 or 3 in a resource selection apparatus or UE.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A base station comprising:
a transceiver configured to:
transmit a handover request to another base station according to a measurement result received from a terminal, the handover request comprising information that the terminal is performing D2D communication, and an allocation mode and a resource location of a D2D communication resource used by the terminal;
receive configuration information fed back from the another base station according to the handover request, the configuration information comprising
a time-frequency location of a resource pool for the terminal to select a resource for D2D communication to be used in a second mode in a cell of the another base station; and
a resource location of a resource to be used in a first mode in the cell of the another base station; and
processor circuitry configured to:
configure the configuration information in the terminal.

2. The base station according to claim 1, the configuration information further comprising information indicating whether the another base station supports a resource allocation scheme in the first mode, and a resource location of a resource used in the first mode in the cell of the another base station.

3. A communication system, comprising a first base station, a second base station and a terminal, wherein,
the first base station is configured to transmit a handover request to the second base station according to a measurement result transmitted by the terminal, the handover request comprising information that the terminal is performing D2D communication, and an allocation mode and a resource location of a D2D communication resource used by the terminal, and
receive configuration information fed back from the second base station according to the handover request, the configuration information comprising:

a time-frequency location of a resource pool for the terminal to select a resource for D2D communication to be used in a second mode in a cell of the second base station; and a resource location of a resource to be used in a first mode in the cell of the second base station;

the first base station is further configured to configure the configuration information in the terminal; and processor circuitry in the terminal is configured to select the resource for D2D communication used in the second mode among the first mode and the second mode in the cell of the second base station.

4. The communication system according to claim 3, the configuration information further comprising information indicating whether the second base station supports a resource allocation scheme in the first mode, and a resource location of a resource used in the first mode in the cell of the second base station.

5. A terminal comprising:

a transmitter configured to transmit to a first base station a signal including a measurement result; and, a receiver configured to receive a configuration information from a second base station via the first base station, the configuration information including a time-frequency location of a resource pool for the terminal to select a resource for D2D communication used in a second mode, and/or a resource location of a resource used in a first mode in the cell of the second base station; and processor circuitry in the terminal configured to select the resource for D2D communication used in the second mode among the first mode and the second mode when the configuration information includes the time-frequency location used in the second mode.

6. The terminal according to claim 5, the configuration information further comprising information indicating whether the second base station supports a resource allocation scheme in the first mode, and a resource location of a resource used in the first mode in the cell of the second eNB.

* * * * *